(12) United States Patent  
Tyndall (10) Patent No.: US 7,210,403 B1  
(45) Date of Patent: May 1, 2007

(54) FLAIR-UP RESISTANT FRONT LOADING ROASTING SYSTEM

(76) Inventor: Carter Tyndall, 6427 N. Amethyst Ter., Crystal River, FL (US) 34428

( * ) Notice: Subject to any disclaimer, the term of this patent is extended or adjusted under 35 U.S.C. 154(b) by 446 days.

(21) Appl. No.: 10/713,694

(22) Filed: Nov. 14, 2003

(51) Int. Cl.
*A47J 37/04* (2006.01)

(52) U.S. Cl. .................... 99/427; 99/421 H; 99/421 P; 126/25 AA; 126/41 B (58) Field of Classification Search ................ 99/427, 99/419, 421 H, 421 P; 126/21 A, 41 B, 126/25 AA
See application file for complete search history.

(56) References Cited

U.S. PATENT DOCUMENTS

| | | | | |
|---|---|---|---|---|
| 2,306,517 | A * | 12/1942 | Benson | 99/421 H |
| 3,379,119 | A * | 4/1968 | Harrill | 99/421 R |
| 3,447,445 | A * | 6/1969 | Koziol | 99/421 R |
| 4,114,523 | A * | 9/1978 | Eff | 99/393 |
| 4,403,540 | A * | 9/1983 | Erkelenz | 99/375 |
| 4,409,452 | A * | 10/1983 | Oouchi et al. | 219/752 |
| 4,510,854 | A | 4/1985 | Robertson | |
| 4,810,856 | A | 3/1989 | Jovanovic | |
| 4,817,582 | A * | 4/1989 | Oslin et al. | 126/21 A |
| 5,205,207 | A * | 4/1993 | McGuire | 99/340 |
| D349,419 | S | 8/1994 | Koopman | |
| 5,373,778 | A | 12/1994 | Moreth | |
| 5,431,093 | A | 7/1995 | Dodgen | |
| 6,101,929 | A * | 8/2000 | Saito | 99/403 |
| 6,264,829 | B1 * | 7/2001 | Antalffy et al. | 208/131 |

\* cited by examiner

*Primary Examiner*—Reginald L. Alexander (57) ABSTRACT

A flair-up resistant front loading roasting system for roasting large quantities safely with a reduced potential for grease induced flair-ups during cooking. The system includes a roasting enclosure adapted for receiving meat to be roasted. The roasting enclosure has a bottom wall, back wall, front wall, pair of side walls, and a door. The side walls taper from the top of the back wall downwardly to a top of the front wall. The door has a top door front wall and a pair of side walls. With the door closed the roasting enclosure has a generally rectangular cross section. A rotating assembly is operationally coupled to the roasting enclosure. A shaft member removably engaged by the rotating assembly. The shaft member is used to pierce and hold at least one piece of meat to be roasted. At least one burner is positioned within the roasting enclosure.

18 Claims, 8 Drawing Sheets

FLAIR-UP RESISTANT FRONT LOADING ROASTING SYSTEM

CROSS REFERENCE TO RELATED APPLICATION

This application is a substitute application for utility patent application Ser. No. 08/796,794 abandoned.

BACKGROUND OF THE INVENTION

1. Field of the Invention

The present invention relates to gas fired ovens and more particularly pertains to a new flair-up resistant front loading roasting system for roasting large quantities safely with a reduced potential for grease induced flair-ups during cooking.

2. Description of the Prior Art

The use of gas fired ovens or cooking devices is known in the prior art. Known prior art Cooking Devices include U.S. Pat. No. 4,810,856; U.S. Pat. No. 4,114,523; U.S. Design Patent 349,419; U.S. Pat. No. 5,431,093; U.S. Pat. No. 4,510,854 and U.S. Pat. No. 5,373,778.

SUMMARY OF THE INVENTION

The system includes a roasting enclosure adapted for receiving meat to be roasted. The roasting enclosure has a bottom wall, back wall, front wall, pair of side walls, and a door. The side walls taper from the top of the back wall downwardly to a top of the front wall. The door has a top door front wall and a pair of side walls. With the door closed the roasting enclosure has a generally rectangular cross section. A rotating assembly is operationally coupled to the roasting enclosure. A shaft member removably engaged by the rotating assembly. The shaft member is used to pierce and hold at least one piece of meat to be roasted. At least one burner is positioned within the roasting enclosure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
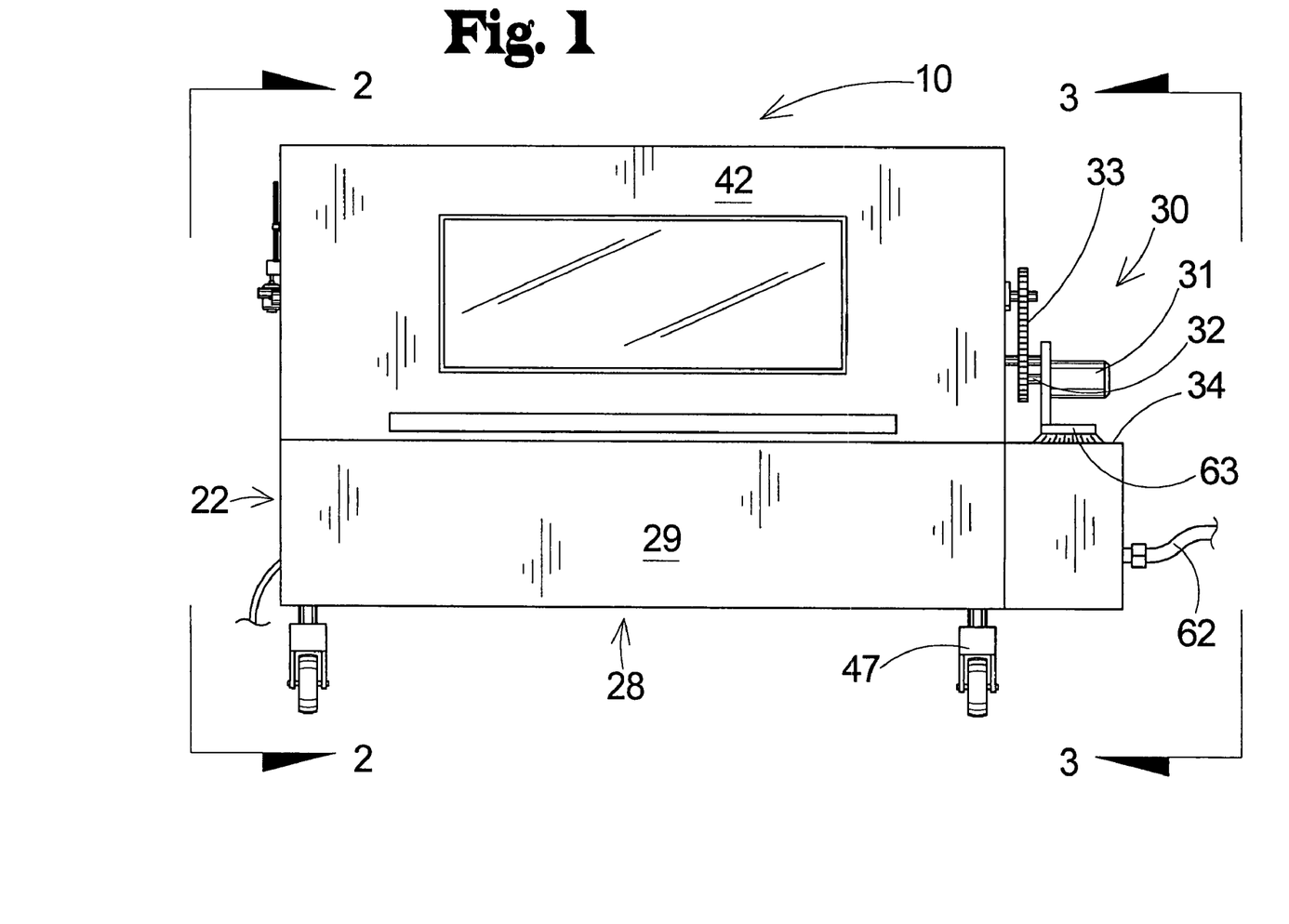
FIG. 1 is a schematic front view of a new flair-up resistant front loading roasting system according to the present invention.
Figure 2:
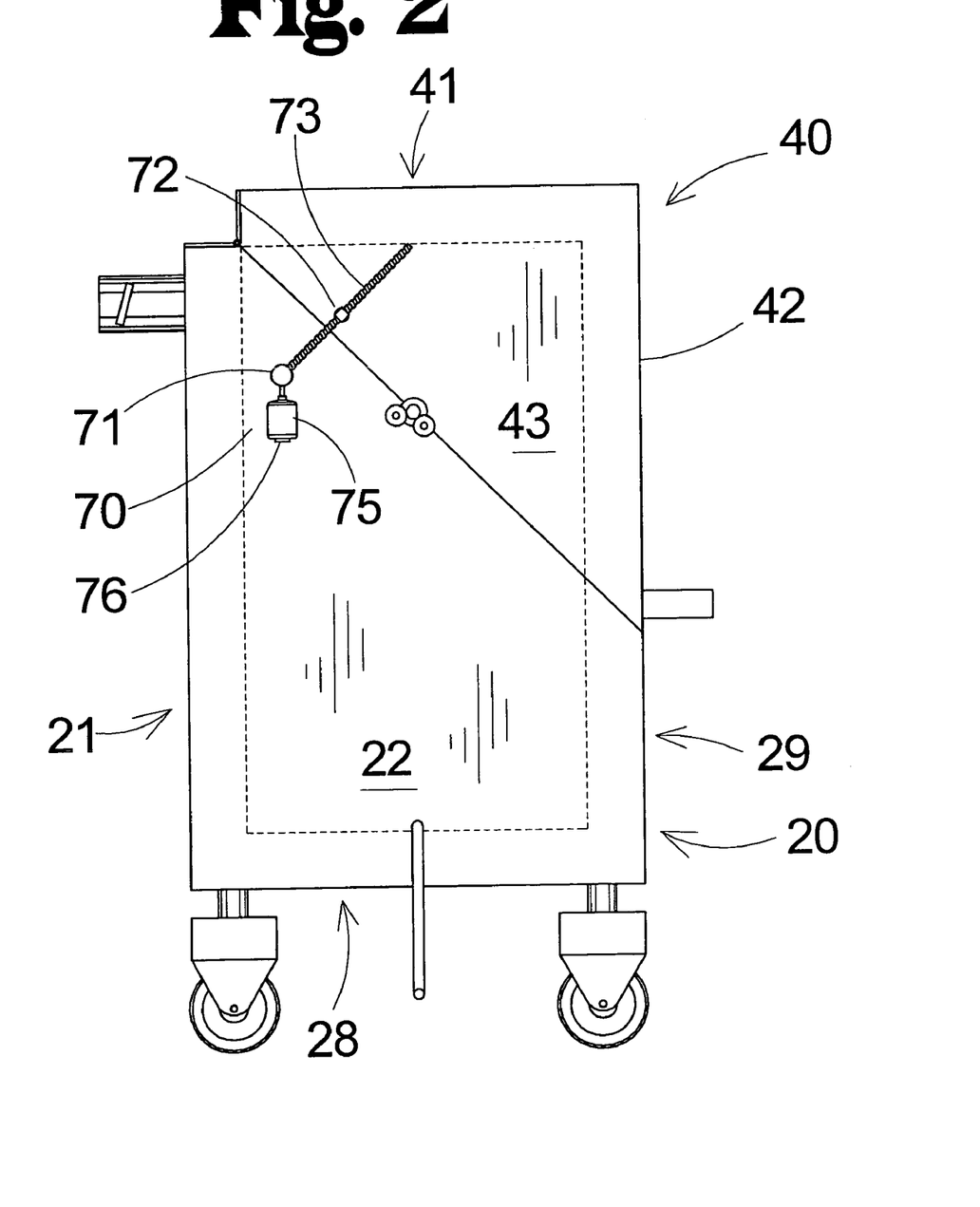
FIG. 2 is a schematic side view of the present invention.
Figure 3:
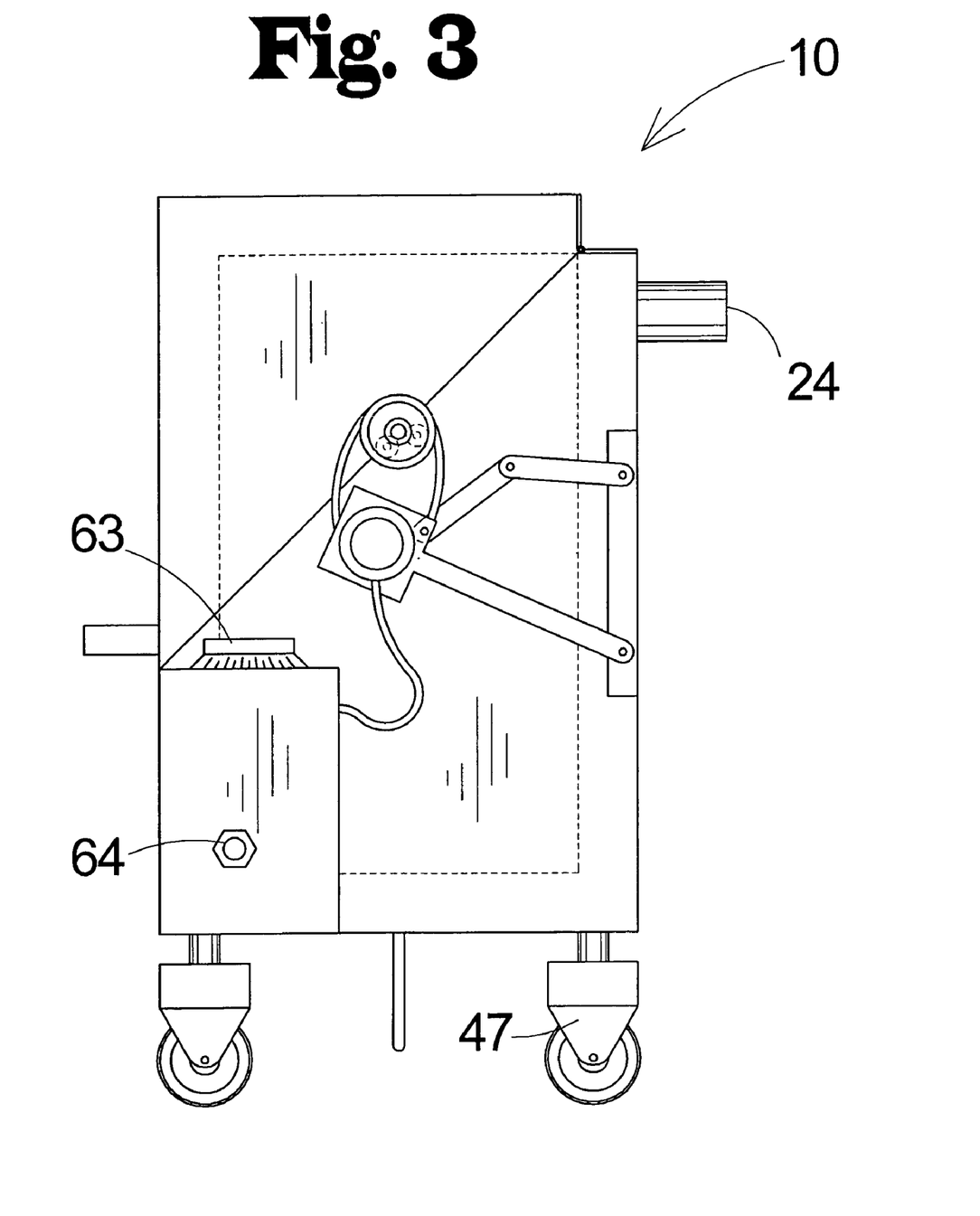
FIG. 3 is a schematic side view of the present invention.
Figure 4:
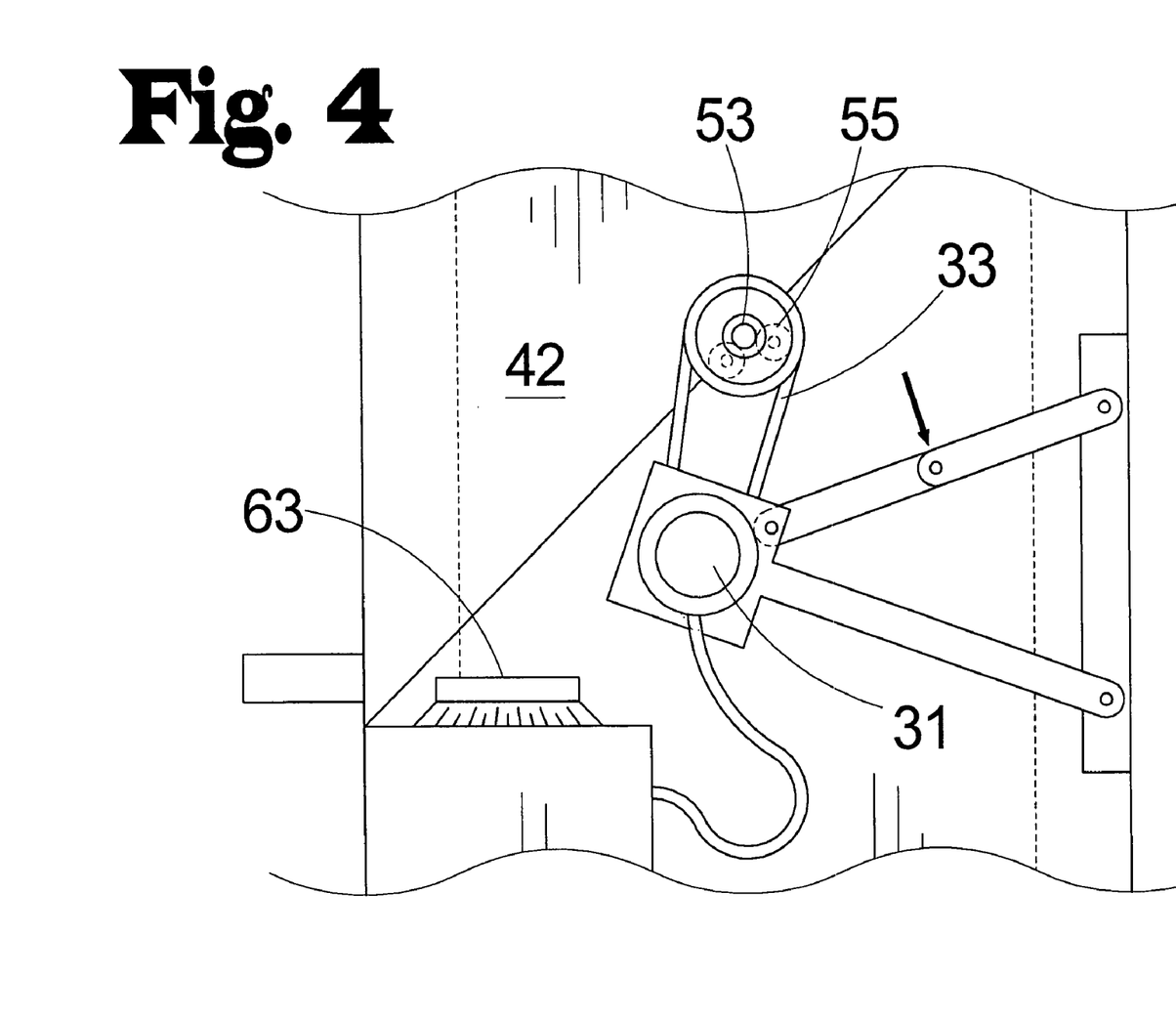
FIG. 4 is a schematic detail view of the rotating means of an embodiment of the present invention.
Figure 5:
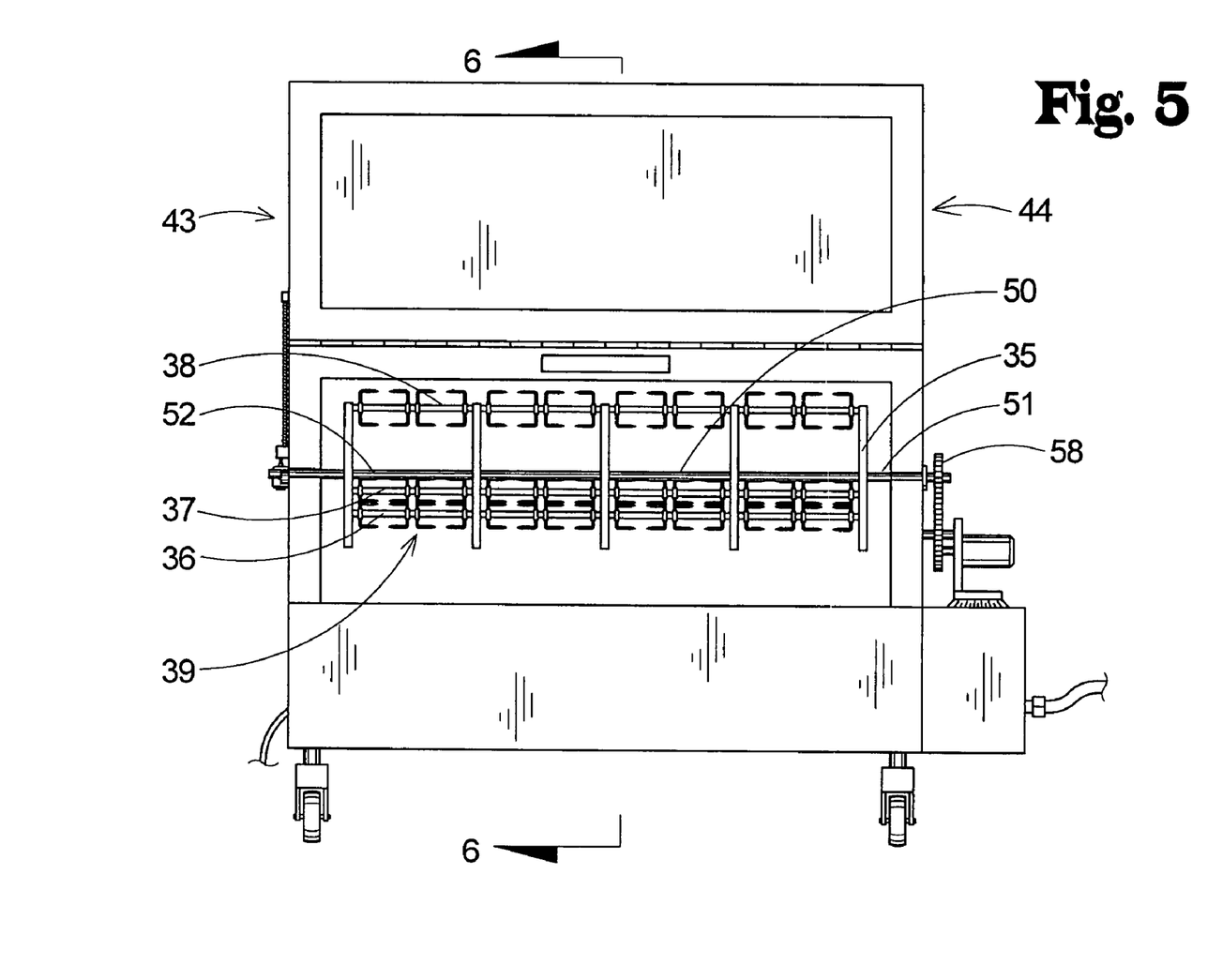
FIG. 5 is a schematic front view of the present invention with the door in an open position.
Figure 6:
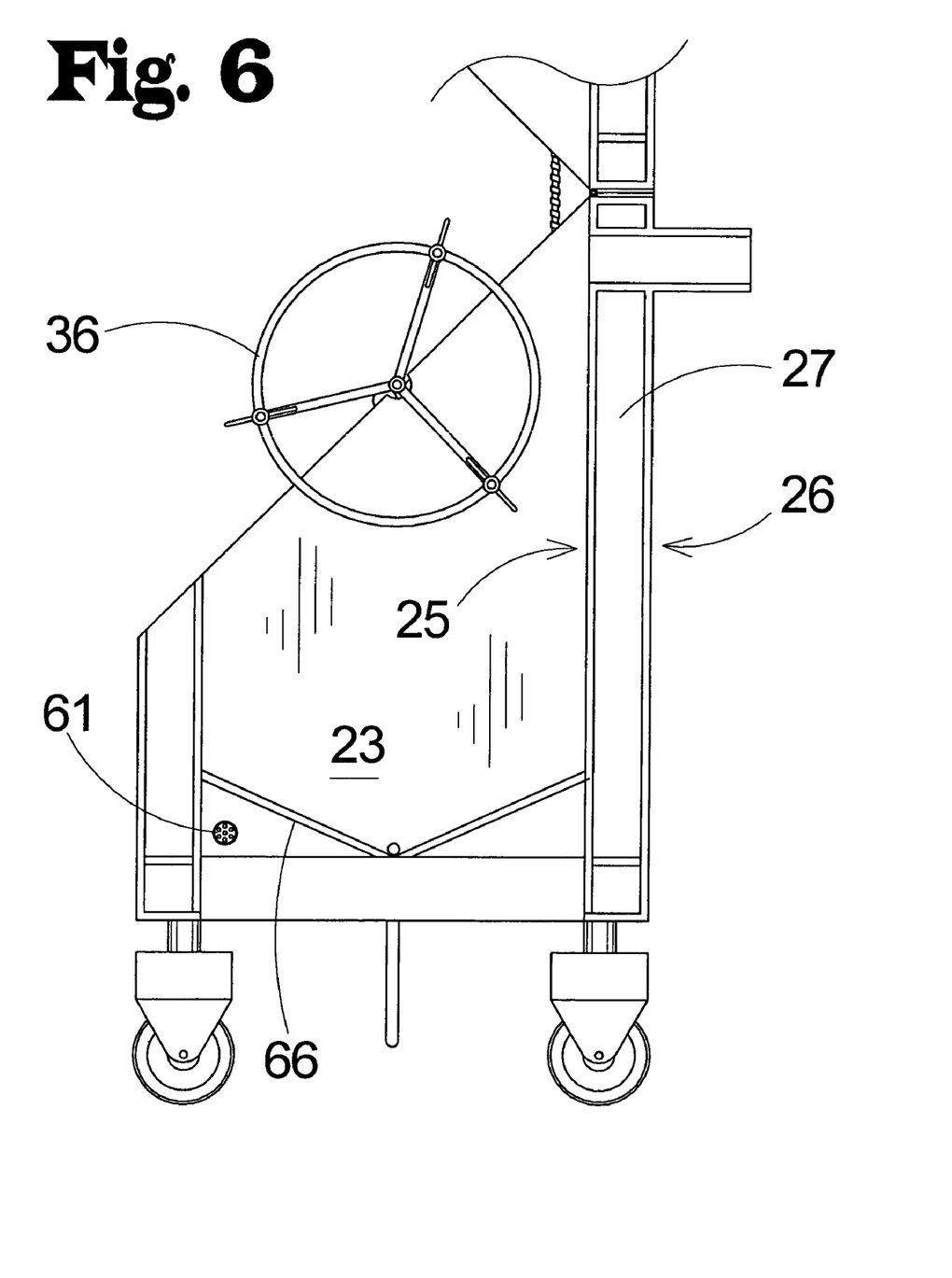
FIG. 6 is a schematic cross-sectional view of the present invention taken along line 6—6 of FIG. 5.
Figure 7:
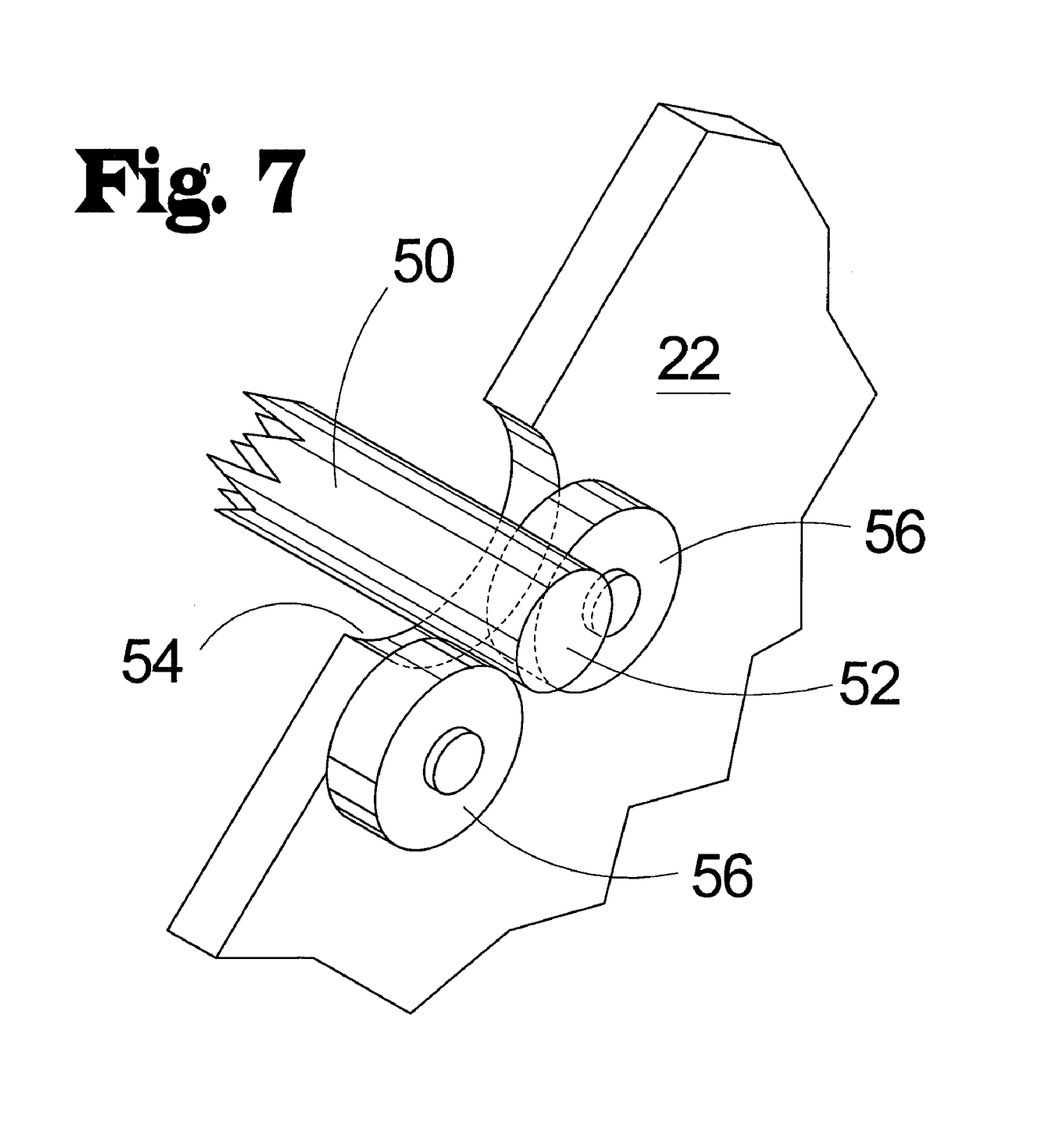
FIG. 7 is a schematic detail view of the linear actuator assembly of the present invention.
Figure 8:
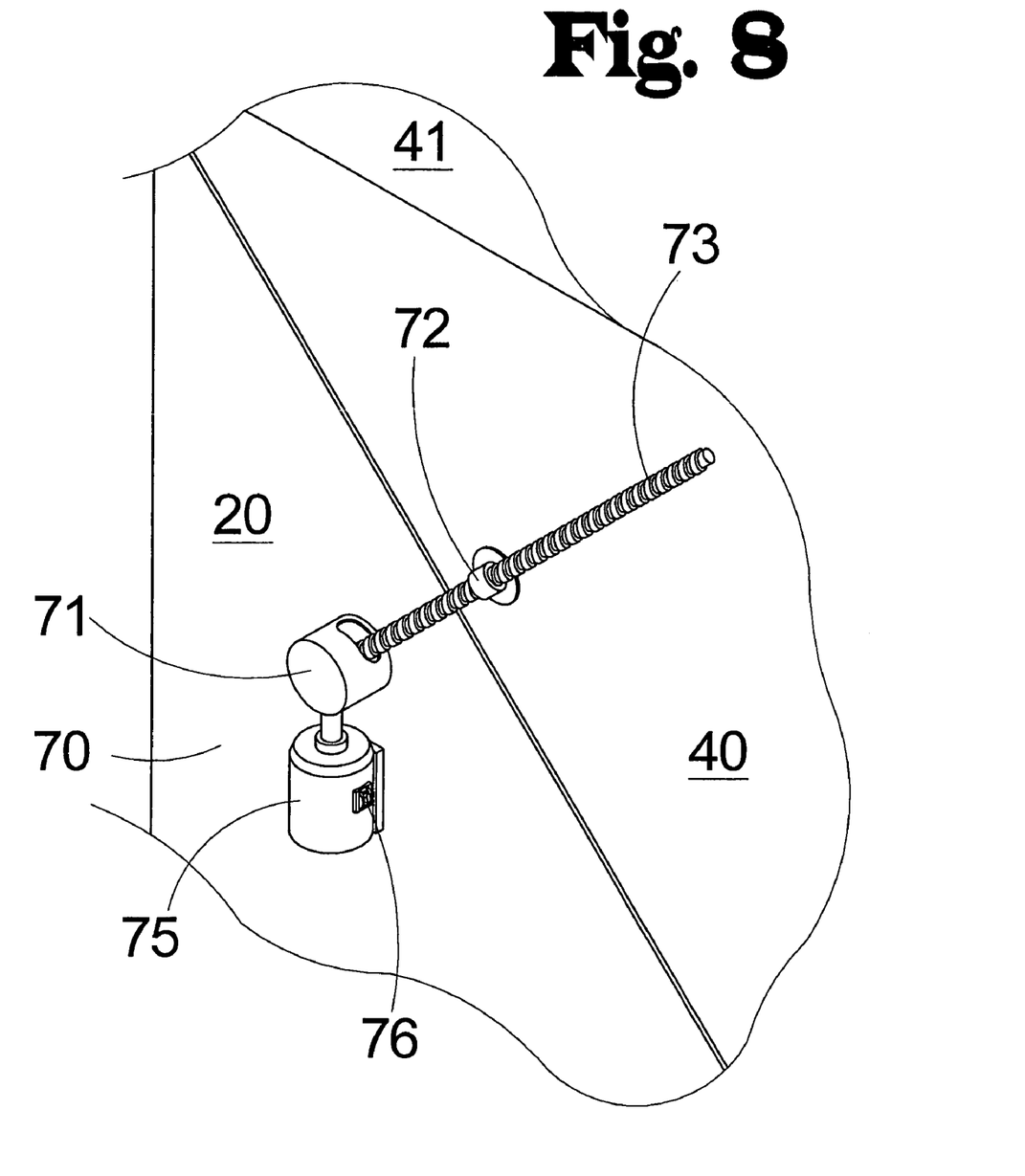
FIG. 8 is a schematic detail view of the collar guides and carrier bearing of the present invention.

With reference now to the drawings, and in particular to FIGS. 1 through 8 thereof, a new flair-up resistant front loading roasting system embodying the principles and concepts of the present invention and generally designated by the reference numeral 10 will be described.

As best illustrated in FIGS. 1 through 8, the flair-up resistant front loading roasting system 10 generally comprises a roasting enclosure 20, a rotating means 30, and a shaft member 50.

The roasting enclosure 20 includes a back 21 and a pair of sides 22,23. The roasting enclosure 20 also includes a door 40 for facilitating access to an interior portion of the roasting enclosure 20. The roasting enclosure 20 includes a pair of apertures. Each one of the apertures extends through an associated one of the sides 22,23.

The rotating means 30 is operationally coupled to the roasting enclosure 20.

The shaft member 50 engages the rotating means 30 and is removable. The shaft member 50 includes a proximal end 51 and a distal end 52. The proximal end 51 may be engaged with the rotating means 30. The shaft member 50 is positionable substantially within the roasting enclosure 20. The proximal end 51 extends outwardly through a first one of the apertures. Similarly, the distal end 52 extends outwardly from a second one of the pair of apertures. A heating means 60 is preferably positioned within the roasting enclosure 20.

In an embodiment the roasting enclosure 20 further comprises and interior wall (or shell) 25, an exterior wall (or shell) 26, and a quantity of insulating material 27. The interior wall 25 has a spaced parallel relationship with the exterior wall 26, and is operationally coupled to the exterior wall 26. The interior 25 and exterior walls 26 define a wall interior space. The insulating material 27 is positioned within and substantially fills the wall interior space. The insulating material 27 inhibits radiated heat transfer between an interior of the roasting enclosure 20 and an external surface of the exterior wall 26.

The roasting enclosure 20 may also be defined in terms of a bottom wall 28, back, wall 21, front wall 29, pair of side walls 22,23, and a door 24. The bottom wall 28 provides a base for the roasting enclosure 20. The bottom wall 28 includes a back edge, a front edge, and a pair of side edges. The back wall 21 is operationally coupled to the bottom wall 28 adjacent to the back edge of the bottom wall 28. Similarly, the front wall 29 is operationally coupled to the bottom wall 28 adjacent to the front edge of the bottom wall 28. The front wall 29 has a height less than a height of the back wall 21. Each one of the pair of side walls 22, 23 is operationally coupled to the bottom wall adjacent to an associated one of the side edges of the bottom wall 28. Each one of the side walls 22,23 tapers from the top of the back wall 21 to the top of the front wall 29. The door 40 is preferably pivotally coupled to the back wall 21. The door 40 is for selectively opening and closing the roasting enclosure 20. The back 21, front 29, and side walls 22,23 and the door 40 each includes an interior wall 25 and an exterior wall 26 with insulating material 27 positioned between the interior 25 and exterior 26.

In an embodiment the door 40 further comprises a top wall 41, a door front wall 42, and a pair of door side walls 43,44. The top wall 41 may be pivotally coupled to the back wall 21. The top wall 41 has a width approximately equal to a width of the bottom wall 28. The door front wall 42 is coupled to the top wall 41, and extends from the top wall 41 to a top edge of the front wall 29 when the door 40 is in a closed position. The pair of door side walls 43,44 are each operationally coupled to the top wall 41. Each one of the pair of door side walls 43, 44 is positioned adjacent an associated side of the top wall 41. The pair of door side walls 43,44 taper from the top wall 41 to a bottom edge of the door front wall 42. Preferably, the door 40 is shaped such that the roasting enclosure 20 has a rectangular cross-section when the door 40 is in a closed position.

Preferably, the rotating means 30 comprises an electric motor 31 operationally coupled to the roasting enclosure 20. The electric motor 31 includes a rotating shaft 32 extending therefrom. A drive member 33 may be coupled to the rotating shaft 32. The drive member 33 facilitates transfer of rotational energy from the rotating shaft 30 to the shaft receiving assembly. A switch member 34 may also be used for selectively applying and interrupting electrical power to the electric motor 31 whereby the electric motor 31 may be turned on and off.

In a preferred embodiment, the rotating means 30 causes the shaft member 50 to rotate at nine rpm with a direction of rotation that caused the shaft 50 to rotate downwardly towards the front of the roasting enclosure 20, and upwardly towards the back of the roasting enclosure 20. This direction of rotation causes most of the grease dripping from the meat being roasted to drip off at the rear of the roasting enclosure 20 rather than the front, helping to minimize flair-ups.

In an embodiment the shaft receiving assembly further comprises a rotating member 58, a pair of collar members or guides 53, and a first 55 and second pair of carrier bearings 56. The rotating member 58 is used for engaging the drive member 33 such that rotation of the rotating shaft 32 moves the drive member 33 which in-turn rotates the rotating member 58. Each one of the collar guides 53 is positioned adjacent to an associated one of the apertures. Each one of the collar guides 53 facilitates positioning of the shaft member 50 such that the shaft member 50 may be rotated by the rotating member 58. The first pair of carrier bearing 55 is positioned adjacent to a first one of the apertures for facilitating support and rotation of the shaft member 50. Similarly, the second pair of carrier bearing 56 is positioned adjacent to a second one of the apertures for facilitating support and rotation of the shaft member 50.

In an embodiment the heating means 60 further comprises at least one gas burner 61, a gas supply line 62, a thermostat 63, and at least one pilot safety control 64. The burner 61 is preferably positioned in a lower portion of the roasting enclosure 20. The gas supply line 62 includes a first and second end. The first end is operationally coupled to the burner 61. The second end extends through a wall of the roasting enclosure to an exterior environment. The second end is couplable to a gas supply. The gas supply may be propane or natural gas and may be either supplied by bottle or through an installed supply line. The thermostat 63 is operationally coupled to the gas supply line 62 for controlling a temperature internal to the roasting enclosure 20. The pilot safety control 64 is used such that flow of gas through the gas supply line 62 is interrupted if a pilot light is extinguished.

A linear actuator assembly 70 is preferably operationally coupled to a side of the roasting enclosure 20 and the door 40. The linear actuator assembly 70 facilitates opening and closing of the door 40.

In an embodiment the linear actuator assembly 70 further comprises a first coupling member 71 operationally coupled to the door 40. A second coupling member 72 is operationally coupled to a side of the roasting enclosure 20. A jacking screw 73 is routed through the first 71 and second coupling members 73 such that rotating the jacking screw 73 in a first direction opens the door 40, while rotating the jacking screw in a second direction closes the door 40. A linear actuator drive motor 75 is operationally coupled to the jacking screw 73. The linear actuator drive motor 75 converts electrical energy into rotational energy. An actuator control switch 76 is operationally coupled to the linear actuator drive motor 75 for controlling rotating and direction of rotation of the linear actuator drive motor 75.

A plurality of wheels 76 may be coupled to an exterior surface of the bottom wall 28 for facilitating moving the system 10.

A poultry assembly 35 may be couplable to the shaft member 50. The poultry assembly 35 is designed for engaging a plurality of fowl for facilitating rotisserie style roasting.

In an embodiment the poultry assembly 35 further comprises a plurality of spacing members 36 couplable to the shaft member 50. A plurality of secondary shaft members 37 are positionable between the spacing members 36. A plurality of fowl engagement members 38 slidably engages with the secondary shafts 37. Each one of the fowl engagement members 38 includes at least one prong 39 for insertion into the fowl for securing the fowl to the poultry assembly 35.

A drip pan 66 may be removably positioned within the roasting enclosure 20 between the shaft member 50 and the heating means 30. The drip pan 66 is for collecting grease produced during roasting.

An exhaust port 24 extends through a wall of the roasting enclosure 20 facilitating ventilation of an interior of the roasting enclosure.

In an embodiment, the interior 25 and exterior walls 26 of the roasting enclosure 20 are made from stainless steal. Additionally, the system 10 is optimally sized with an overall length of approximately 60 inches, an overall height of approximately 36 inches, and an overall width of approximately 24 inches.

In use, either the shaft member individually or in conjunction with the poultry assembly is used to secure the carcass or carcasses of the animals to be roasted. The system is ideally designed for use with pigs, chickens, and turkeys; but all manner of animals including but not limited to beef, lamb, ducks, geese, pheasants, and goats may also be used. The shaft member is positioned on the collar guides. Thus the shaft is operationally coupled to the rotating member. The burner is ignited and the animal is roasted inside of the roasting enclosure. The rotating means may be activated during all or part of the roasting process as desired by the user.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flare-up resistant front loading roasting system comprising:
    a roasting enclosure having a back and a pair of sides, said roasting enclosure having a door for facilitating access to an interior portion of said roasting enclosure, said roasting enclosure having a pair of apertures, each one of said apertures extending through an associated one of said sides;
    a rotating assembly operationally coupled to said roasting enclosure;
    a shaft member removeably engageable by said rotating assembly such that said rotating assembly is capable of rotating said shaft member, said shaft member having a proximal end and a distal end, said proximal end being engageable with said rotating assembly, said shaft member being positionable substantially within said roasting enclosure, said proximal end extending outwardly through a first one of said apertures, said distal end extending outwardly from a second one of said pair of apertures; and
    a heat source positioned within said roasting enclosure; wherein said rotating assembly includes:
        a driven pulley mounted on said shaft member;
        a first arm having a first end and a second end, said first end being pivotally mounted on said roasting enclosure;
        a motor mounted on said first arm toward said second end of said first arm to permit pivoting of said motor with respect to said roasting enclosure;
        a driver pulley mounted on a shaft of said motor;
        a second arm having a first segment and a second segment pivotally mounted together, said first segment being rotatably mounted on said roasting enclosure, said second segment being mounted to said first arm such that said first and second segments pivot with respect to each other when said first arm pivots on said roasting enclosure;
        wherein said driver pulley is movable toward and away from said driven pulley when said first arm is pivoted.

2. The system of claim 1, wherein said roasting enclosure further comprises:
    an interior wall and an exterior wall, said interior wall having a spaced parallel relationship with said exterior wall, said interior wall being operationally coupled to said exterior wall, said interior and exterior walls defining a wall interior space;
    an insulating material positioned within and substantially filling said wall interior space, said insulating material inhibiting radiated heat transfer between an interior of said roasting enclosure and an external surface of said exterior wall.

3. The system of claim 1, wherein said roasting enclosure further comprises:
    a bottom wall providing a base for said roasting enclosure, said bottom wall having a back edge, a front edge, and a pair of side edges;
    a back wall operationally coupled to said bottom wall adjacent to said back edge of said bottom wall;
    a front wall operationally coupled to said bottom wall adjacent to said front edge of said bottom wall, said front wall having a height less than a height of said back wall;
    a pair of side walls, each one of said pair of side walls being operationally coupled to said bottom wall adjacent to an associated one of said side edges of said bottom wall, each one of said side walls tapering from top of said back wall to a top of said front wall; and
    said door being pivotally coupled to said back wall, said door being for selectively opening and closing said roasting enclosure.

4. The system of claim 3, wherein said door further comprises:
    a top wall pivotally coupled to said back wall, said top wall having a width approximately equal to a width of said bottom wall;
    a door front wall coupled to said top wall, said door front wall extending from said top wall to a top edge of said front wall when said door is in a closed position;
    a pair of door side walls operationally coupled to said top wall, each one of said pair of door side walls being positioned adjacent an associated side of said top wall, said pair of door side walls tapering from said top wall to a bottom edge of said door front wall;
    said door being shaped such that said roasting enclosure has a rectangular cross-section when said door is in a closed position.

5. The system of claim 1, wherein said rotating assembly further comprises:
    a motor assembly operationally coupled to said roasting enclosure, said motor assembly being positioned adjacent to a side of said roasting enclosure; and
    a shaft receiving assembly positioned adjacent to one of said pair of apertures.

6. The system of claim 5, further comprising:
    an electric motor operationally coupled to said roasting enclosure, said electric motor having a rotating shaft extending therefrom;
    a drive member couplable to said rotating shaft, said drive member facilitating transfer of rotational energy from said rotating shaft to said shaft receiving assembly;
    a switch member for selectively applying and interrupting electrical power to said electric motor whereby said electric motor may be turned on and off.

7. The system of claim 6, wherein said shaft receiving assembly further comprises:
    a rotating member for engaging said drive member such that rotation of said rotating shaft moves said drive member which in-turn rotates said rotating member;
    a pair of collar guides, each one of said collar guides positioned adjacent to an associated one of said apertures, each one of said collar guides facilitating positioned of said shaft member such that said shaft member is rotatable by said rotating member;
    a first pair of carrier bearing positioned adjacent to a first one of said apertures for facilitating support and rotation of said shaft member; and
    a second pair of carrier bearing positioned adjacent to a second one of said apertures for facilitating support and rotation of said shaft member.

8. The system of claim 1, wherein said heat source further comprises:
   at least one burner positioned in a lower portion of said roasting enclosure;
   a gas supply line having a first and second end, said first end being operationally coupled to said burner, said second end extending through a wall of said roasting enclosure to an exterior environment, said second end being couplable to a gas supply.

9. The system of claim 8, wherein said heat source further comprises:
   a thermostat operationally coupled to said gas supply line for controlling a temperature internal to said roasting enclosure;
   at least one pilot safety control such that flow of gas through said gas supply line is interrupted if a pilot light is extinguished.

10. The system of claim 1, further comprising a linear actuator assembly operationally coupled to a side of said roasting enclosure and said door, said linear actuator assembly facilitating opening and closing of said door;
   wherein said linear actuator assembly further comprises:
      a first coupling member operationally coupled to said door;
      a second coupling member operationally coupled to a side of said roasting enclosure;
      a jacking screw threaded through said first and second coupling members such that rotating said jacking screw in a first direction opens said door and rotating said jacking screw in a second direction closes said door;
      a linear actuator drive motor operationally coupled to said jacking screw, said linear actuator drive motor converting electrical energy into rotational energy; and
      an actuator control switch operationally coupled to said linear actuator drive motor for controlling rotating and direction of rotation of said linear actuator drive motor.

11. The system of claim 1, further comprising a plurality of wheels coupled to an exterior surface of said bottom wall, said plurality of wheels facilitating moving said system.

12. The system of claim 1, further comprising a poultry assembly couplable to said shaft member, said poultry assembly being adapted for engaging a plurality of fowl for facilitating rotisserie roasting.

13. The system of claim 12, wherein said poultry assembly further comprises:
   a plurality of spacing members couplable to said shaft member;
   a plurality of secondary shaft members positionable between said spacing members; and
   a plurality of fowl engagement members slidably engageable with said secondary shafts, each one of said fowl engagement members having at least one prong for insertion into the fowl for securing the fowl to said poultry assembly.

14. The system of claim 1, further comprising a drip pan removably positionable within said roasting enclosure between said shaft member and said heat source for collecting grease produced during roasting, said drip pan having a pair of walls defining a channel for receiving drippings falling on said wall of said drip pan, said channel extending from one of said sides of said sides of said roasting enclosure to another one of said sides of said roasting enclosure.

15. The system of claim 1, further comprising an exhaust port extending through a wall of said roasting enclosure, said exhaust port facilitating ventilation of an interior of said roasting enclosure.

16. A Flare-Up Resistant Front Loading Roasting System comprising:
   a roasting enclosure having a back and a pair of sides, said roasting enclosure having a door for facilitating access to an interior portion of said roasting enclosure, said roasting enclosure having a pair of apertures, each one of said apertures extending through an associated one of said sides;
   a rotating means operationally coupled to said roasting enclosure;
   a shaft member removeably engageable by said rotating means, said shaft member having a proximal end and a distal end, said proximal end being engageable with said rotating means, said shaft member being positionable substantially within said roasting enclosure, said proximal end extending outwardly through a first one of said apertures, said distal end extending outwardly from a second one of said pair of apertures; a heating means positioned within said roasting enclosure;
   wherein said roasting enclosure further comprises:
   an interior wall and an exterior wall, said interior wall having a spaced parallel relationship with said exterior wall, said interior wall being operationally coupled to said exterior wall, said interior and exterior walls defining a wall interior space;
   an insulating material positioned within and substantially filling said wall interior space, said insulating material inhibiting radiated heat transfer between an interior of said roasting enclosure and an external surface of said exterior wall;
   a bottom wall providing a base for said roasting enclosure, said bottom wall having a back edge, a front edge, and a pair of side edges;
   a back wall operationally coupled to said bottom wall adjacent to said back edge of said bottom wall;
   a front wall operationally coupled to said bottom wall adjacent to said front edge of said bottom wall, said front wall having a height less than a height of said back wall;
   a pair of side walls, each one of said pair of side walls being operationally coupled to said bottom wall adjacent to an associated one of said side edges of said bottom wall, each one of said side walls tapering from top of said back wall to a top of said front wall;
   said door being pivotally coupled to said back wall, said door being for selectively opening and closing said roasting enclosure;
   said back, front, and side walls and said door each having an interior wall and an exterior wall with insulating material positioned therebetween;
   wherein said door further comprises:
   a top wall pivotally coupled to said back wall, said top wall having a width approximately equal to a width of said bottom wall;
   a door front wall coupled to said top wall, said door front wall extending from said top wall to a top edge of said front wall when said door is in a closed position;
   a pair of door side walls operationally coupled to said top wall, each one of said pair of door side walls being positioned adjacent an associated side of said top wall, said pair of door side walls tapering from said top wall to a bottom edge of said door front wall;

said door being shaped such that said roasting enclosure has a rectangular cross-section when said door is in a closed position;

an electric motor operationally coupled to said roasting enclosure, said electric motor having a rotating shaft extending therefrom;

a drive member couplable to said rotating shaft, said drive member facilitating transfer of rotational energy from said rotating shaft to said shaft receiving assembly;

a switch member for selectively applying and interrupting electrical power to said electric motor whereby said electric motor may be turned on and off;

wherein said shaft receiving assembly further comprises:

a rotating member for engaging said drive member such that rotation of said rotating shaft moves said drive member which in-turn rotates said rotating member;

a pair of collar guides, each one of said collar guides positioned adjacent to an associated one of said apertures, each one of said collar guides facilitating positioned of said shaft member such that said shaft member is rotatable by said rotating member;

a first pair of carrier bearing positioned adjacent to a first one of said apertures for facilitating support and rotation of said shaft member; and a second pair of carrier bearing positioned adjacent to a second one of said apertures for facilitating support and rotation of said shaft member;

wherein said heating means further comprises:

at least one burner positioned in a lower portion of said roasting enclosure;

a gas supply line having a first and second end, said first end being operationally coupled to said burner, said second end extending through a wall of said roasting enclosure to an exterior environment, said second end being couplable to a gas supply;

a thermostat operationally coupled to said gas supply line for controlling a temperature internal to said roasting enclosure;

at least one pilot safety control such that flow of gas through said gas supply line is interrupted if a pilot light is extinguished;

a linear actuator assembly operationally coupled to a side of said roasting enclosure and said door, said linear actuator assembly facilitating opening and closing of said door;

wherein said linear actuator assembly further comprises:

a first coupling member operationally coupled to said door;

a second coupling member operationally coupled to a side of said roasting enclosure;

a jacking screw threaded through said first and second coupling members such that rotating said jacking screw in a first direction opens said door and rotating said jacking screw in a second direction closes said door;

a linear actuator drive motor operationally coupled to said jacking screw, said linear actuator drive motor converting electrical energy into rotational energy; and an actuator control switch operationally coupled to said linear actuator drive motor for controlling rotating and direction of rotation of said linear actuator drive motor;

a plurality of wheels coupled to an exterior surface of said bottom wall, said plurality of wheels facilitating moving said system;

a poultry assembly couplable to said shaft member, said poultry assembly being adapted for engaging a plurality of fowl for facilitating rotisserie roasting;

wherein said poultry assembly further comprises:

a plurality of spacing members couplable to said shaft member;

a plurality of secondary shaft members positionable between said spacing members;

a plurality of fowl engagement members slidably engageable with said secondary shafts, each one of said fowl engagement members having at least one prong for insertion into the fowl for securing the fowl to said poultry assembly;

a drip pan removably positionable within said roasting enclosure between said shaft member and said heating means, said drip pan being for collecting grease produced during roasting; and an exhaust port extending through a wall of said roasting enclosure, said exhaust port facilitating ventilation of an interior of said roasting enclosure.

17. The system of claim 16, further comprising a heat shield positioned between said roasting enclosure and said linear actuator assembly for providing thermal protection to said linear actuator assembly during roasting.

18. The system of claim 1, wherein said roasting enclosure has an upper opening selectively closable by said door, said upper opening being defined by a perimeter edge, each of said apertures being located along said perimeter edge and being in communication with said upper opening such that said shaft member is movable through said upper opening and a portion of said shaft member is positionable in each of said apertures; and a shaft receiving assembly positioned adjacent to each said aperture of said pair of apertures, each of said shaft receiving assemblies comprising:

a pair of carrier bearings being positioned adjacent to the respective said aperture such that said shaft member rests upon said pair of carrier bearings when the portion of said shaft member is positioned in the respective said aperture and said shaft member is rotatable on said carrier bearings, said shaft member being removable from contact with said carrier bearings when said shaft member is lifted out of said apertures and through said upper opening of said roasting enclosure.

* * * * *